(12) United States Patent
Kanezaki et al.

(10) Patent No.: US 12,194,571 B2
(45) Date of Patent: Jan. 14, 2025

(54) WAFER FORMING METHOD (71) Applicant: DISCO CORPORATION, Tokyo (JP)

(72) Inventors: Taizo Kanezaki, Tokyo (JP); Noboru Takeda, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 176 days.

(21) Appl. No.: 17/157,320

(22) Filed: Jan. 25, 2021

(65) Prior Publication Data

US 2021/0245304 A1 Aug. 12, 2021

(30) Foreign Application Priority Data

Feb. 7, 2020 (JP) .................................. 2020-020130

(51) Int. Cl.
*B23K 26/57* (2014.01)
*B06B 1/02* (2006.01)
(Continued)

(52) U.S. Cl.
CPC ................ *B23K 26/57* (2015.10); *B06B 1/02* (2013.01); *B23K 26/0622* (2015.10); *B23K 26/122* (2013.01); *B23K 2101/40* (2018.08)

(58) Field of Classification Search
CPC .. B23K 26/57; B23K 26/0622; B23K 26/122; B23K 2101/40; B23K 2103/56;
(Continued)

(56) References Cited

U.S. PATENT DOCUMENTS

| 4,834,124 A * | 5/1989 | Honda ...................... B06B 3/04 |
| | | 366/127 |
| 2012/0161819 A1* | 6/2012 | Rossi .................... B06B 1/0215 |
| | | 327/109 |

(Continued)

FOREIGN PATENT DOCUMENTS

| CN | 105986290 A * 10/2016 ................ C25D 5/20 |
| DE | 102019200729 A1 * 7/2019 ......... B23K 26/0006 |

(Continued)

OTHER PUBLICATIONS

Office action issued in corresponding Japanese patent application No. 2020-020130, dated Sep. 12, 2023.
(Continued)

*Primary Examiner* — Jimmy Chou
(74) *Attorney, Agent, or Firm* — Greer Burns & Crain Ltd.

(57) ABSTRACT

A wafer forming method includes a peeling layer forming step of applying, to a SiC ingot, a laser beam of such a wavelength as to be transmitted through the SiC ingot, with a focal point of the laser beam positioned at a depth corresponding to a thickness of a wafer to be formed from a first surface of the SiC ingot, to form a peeling layer including a modified section and cracks; and a wafer forming step of immersing the SiC ingot in a liquid and applying an ultrasonic wave to the SiC ingot through the liquid, to thereby peel a part of the SiC ingot with the peeling layer as an interface and form the wafer. In the wafer forming step, the ultrasonic wave is applied to the SiC ingot while a sweep treatment of regularly varying the oscillation frequency of an ultrasonic vibrator is performed.

7 Claims, 7 Drawing Sheets

(51) Int. Cl.
*B23K 26/0622* (2014.01)
*B23K 26/122* (2014.01)
*B23K 101/40* (2006.01)

(58) Field of Classification Search
CPC .... B23K 26/0006; B23K 26/08; B23K 26/53; B06B 1/02; B06B 1/06
See application file for complete search history.

(56) References Cited

U.S. PATENT DOCUMENTS

| | | | |
|---|---|---|---|
| 2015/0162222 A1* | 6/2015 | Obata | H01L 21/78 134/184 |
| 2016/0136775 A1* | 5/2016 | Shinozaki | B08B 3/024 134/1 |
| 2018/0154543 A1* | 6/2018 | Hirata | B26D 7/086 |
| 2018/0229331 A1* | 8/2018 | Hirata | H01L 21/02002 |
| 2019/0006212 A1* | 1/2019 | Iizuka | B24B 7/228 |
| 2019/0039187 A1* | 2/2019 | Sekiya | B23K 26/53 |
| 2019/0160708 A1* | 5/2019 | Hinohara | B28D 5/0011 |
| 2019/0160804 A1* | 5/2019 | Hinohara | B23K 26/0006 |
| 2019/0304769 A1* | 10/2019 | Hirata | B23K 26/0853 |

FOREIGN PATENT DOCUMENTS

| | | | | |
|---|---|---|---|---|
| JP | 06296942 | A | 10/1994 | |
| JP | H06296942 | A * | 10/1994 | |
| JP | 09047733 | A | 2/1997 | |
| JP | 2000094221 | A | 4/2000 | |
| JP | 2000107710 | A | 4/2000 | |
| JP | 2003306349 | A | 10/2003 | |
| JP | 2007311379 | A * | 11/2007 | |
| JP | 2014080346 | A | 5/2014 | |
| JP | 2016111143 | A | 6/2016 | |
| JP | 2016124015 | A | 7/2016 | |
| JP | 2018093106 | A * | 6/2018 | ............. B23K 26/00 |
| JP | 2020021878 | A | 2/2020 | |
| KR | 20070121592 | A * | 12/2007 | ............. G01N 29/28 |

OTHER PUBLICATIONS

Office action issued in corresponding Japanese patent application No. 2020-020130, dated Nov. 24, 2023.

* cited by examiner

WAFER FORMING METHOD

BACKGROUND OF THE INVENTION

Field of the Invention

The present invention relates to a wafer forming method.

Description of the Related Art

A wafer formed with such devices as a semiconductor wafer is normally formed by cutting a cylindrical ingot into a thin form by a wire saw. The cut wafer has its front surface and back surface finished to be mirror surfaces by polishing (see, for example, Japanese Patent Laid-open No. 2000-94221). However, in the method of cutting the ingot by a wire saw and polishing the front surface and the back surface, there is a problem that most part of the ingot is thrown away, which is uneconomical.

In view of the foregoing, the present applicant has proposed a technology of applying, to the ingot, a laser beam of such a wavelength as to be transmitted through the ingot, with a focal point of the laser beam positioned in the inside of the ingot, to form a peeling layer at a planned cutting plane and a technology of peeling off a wafer by using, as a start point, a peeling layer formed by applying, to the ingot, an ultrasonic wave of a frequency equal to or more than a frequency approximate to a specific frequency of the ingot (see, for example, Japanese Patent Laid-open No. 2016-111143 and Japanese Patent Laid-open No. 2018-93106).

SUMMARY OF THE INVENTION

Here, in the technologies disclosed in Japanese Patent Laid-open No. 2016-111143 and Japanese Patent Laid-open No. 2018-93106, it is necessary to vibrate an ultrasonic vibrator at a high amplitude, for efficiently peeling off a wafer from the ingot. While vibrating the ultrasonic vibrator at a resonance frequency is effective for this purpose, the resonance frequency would be varied due to load variation, whereby the amplitude is reduced, making it difficult to achieve stable peeling-off.

Accordingly, it is an object of the present invention to provide a wafer forming method by which a wafer can be stably and efficiently peeled off from an ingot formed with a peeling layer.

In accordance with an aspect of the present invention, there is provided a wafer forming method for forming a wafer from a SiC ingot having a c-axis and a c-plane orthogonal to the c-axis, the wafer forming method including a peeling layer forming step of applying, to the SiC ingot, a laser beam of such a wavelength as to be transmitted through the SiC ingot, with a focal point of the laser beam positioned at a depth corresponding to a thickness of the wafer to be formed from an end surface of the SiC ingot, to form a peeling layer including a modified section and cracks extending along the c-plane from the modified section; and a wafer forming step of immersing the SiC ingot in a liquid and applying an ultrasonic vibration to the SiC ingot through the liquid, to thereby peel off a part of the SiC ingot with the peeling layer as an interface and form the wafer. In the wafer forming step, the ultrasonic vibration is applied to the SiC ingot while a sweep treatment of regularly varying the oscillation frequency of an ultrasonic vibrator is performed.

Preferably, in the wafer forming step, the frequency of the sweep treatment is set to be a frequency equal to or more than a frequency approximate to a specific frequency of the wafer to be formed from the SiC ingot.

Preferably, the oscillation frequency varied by the sweep treatment includes a resonance frequency of the ultrasonic vibrator.

In accordance with another aspect of the present invention, there is provided a wafer forming method for forming a wafer from a SiC ingot having a c-axis and a c-plane orthogonal to the c-axis, the wafer forming method including a peeling layer forming step of applying, to the SiC ingot, a laser beam of such a wavelength as to be transmitted through the SiC ingot, with a focal point of the laser beam positioned at a depth corresponding to a thickness of the wafer to be formed from an end surface of the SiC ingot, to form a peeling layer including a modified section and cracks extending along the c-plane from the modified section; and a wafer forming step of immersing the SiC ingot in a liquid and applying an ultrasonic vibration to the SiC ingot through the liquid, to thereby peel off a part of the SiC ingot with the peeling layer as an interface and form the wafer. In the wafer forming step, the ultrasonic vibration is applied to the SiC ingot while the ultrasonic wave is intermittently oscillated.

Preferably, in the wafer forming step, the frequency of a process ranging from oscillation of the ultrasonic vibration through the rest of the oscillation to the re-oscillation is set to be a frequency equal to or more than a frequency approximate to a specific frequency of the wafer to be formed from the SiC ingot.

Preferably, the oscillation frequency of an ultrasonic vibrator applied to the SiC ingot includes a resonance frequency of the ultrasonic vibrator.

The present invention exhibits an effect that a wafer can be stably and efficiently peeled off from an ingot formed with the peeling layer.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Embodiments of the present invention will be described in detail below referring to the drawings. The present invention is not limited by the contents of description in the following embodiments. In addition, the components described below include those which can easily be conceived of by a person skilled in the art and those which are substantially the same. Further, the following configurations can be combined as required. Besides, various kinds of omission, replacement, or modification are possible within such ranges as not to depart from the gist of the present invention.

First Embodiment

Figure 1:
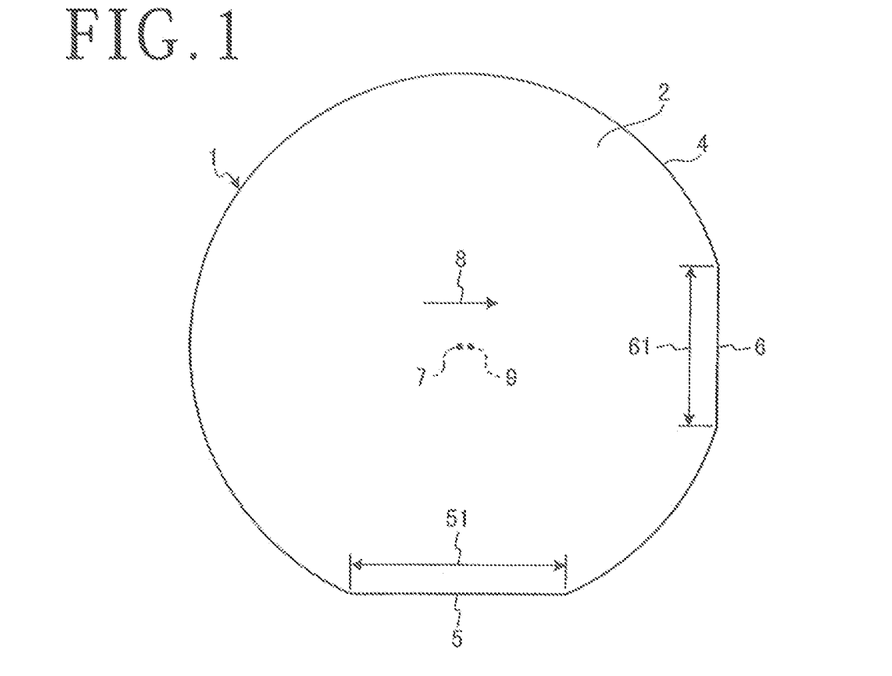
FIG. 1 is a plan view of an ingot as an object of processing by a wafer forming method according to a first embodiment.
Figure 2:
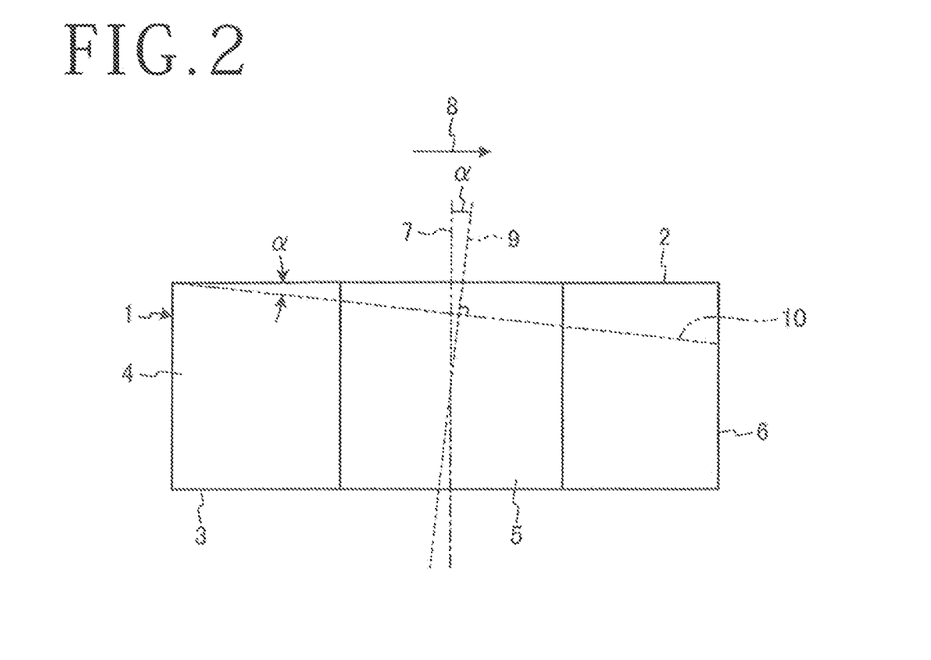
FIG. 2 is a side view of the ingot depicted in FIG. 1.
Figure 3:
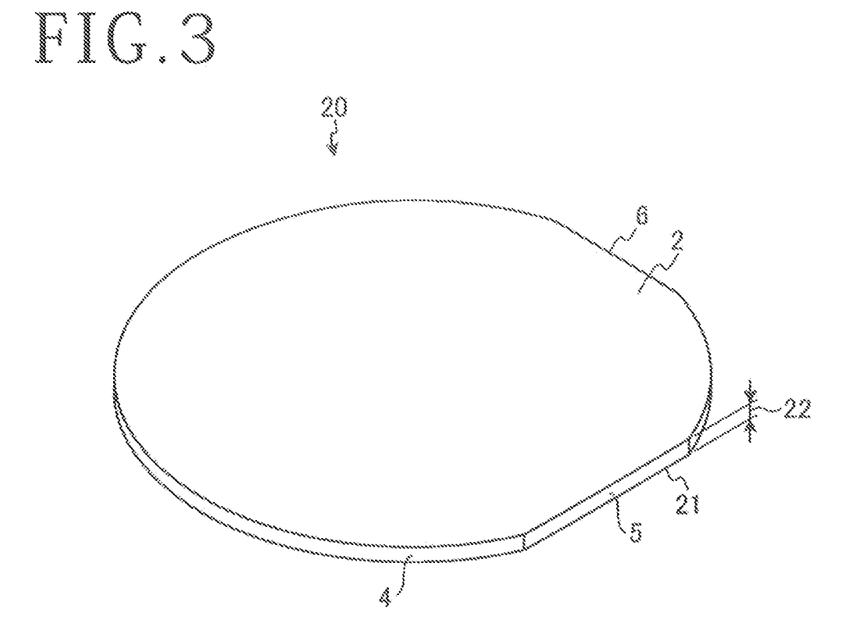
FIG. 3 is a perspective view of a wafer produced by the wafer forming method according to the first embodiment.
Figure 4:
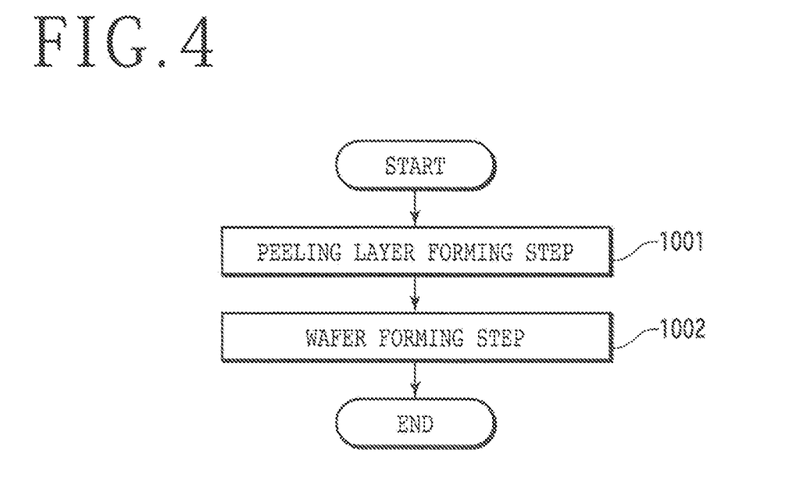
FIG. 4 is a flow chart depicting the flow of the wafer forming method according to the first embodiment.

A wafer forming method according to a first embodiment of the present invention will be described based on the drawings. FIG. 1 is a plan view of an ingot as an object of processing by the wafer forming method according to the first embodiment. FIG. 2 is a side view of the ingot depicted in FIG. 1. FIG. 3 is a perspective view of a wafer produced by the wafer forming method according to the first embodiment. FIG. 4 is a flow chart depicting the flow of the wafer forming method according to the first embodiment.

The wafer forming method according to the first embodiment is a producing method for forming a wafer 20 depicted in FIG. 3 from a SiC ingot 1 which is the ingot depicted in FIGS. 1 and 2.
(SiC Ingot)

In the first embodiment, the SiC ingot 1 illustrated in FIGS. 1 and 2 includes SiC (silicon carbide) and is formed in a cylindrical shape as a whole. In the first embodiment, the SiC ingot 1 is a hexagonal single-crystal SiC ingot.

As depicted in FIGS. 1 and 2, the SiC ingot 1 has a first surface 2 which is a circular end face, a circular second surface 3 on the back side of the first surface 2, and a circumferential surface 4 continuous with an outer edge of the first surface 2 and an outer edge of the second surface 3. In addition, the SiC ingot 1 has, at the circumferential surface 4, a first orientation flat 5 indicative of crystal orientation and a second orientation flat 6 orthogonal to the first orientation flat 5. A length 51 of the first orientation flat 5 is longer than a length 61 of the second orientation flat 6.

Besides, the SiC ingot 1 has a c-axis 9 inclined by an off angle α in an inclination direction 8 toward the second orientation flat 6 relative to a perpendicular 7 of the first surface 2 and a c-plane 10 orthogonal to the c-axis 9. The c-plane 10 is inclined by the off angle α relative to the first surface 2 of the SiC ingot 1. In the SiC ingot 1, the inclination direction 8 of the c-axis 9 from the perpendicular 7 is orthogonal to the extending direction of the second orientation flat 6 and is parallel to the first orientation flat 5. Numberless c-planes 10 are set in the SiC ingot 1 on a molecular level of the SiC ingot 1. In the first embodiment, the off angle α is set to 1°, 3° or 6°, but in the present invention, the SiC ingot 1 can be produced with the off angle α set, for example, freely in a range of 1° to 6°. The SiC ingot 1 has the first surface 2 ground by a grinding apparatus and thereafter polished by a polishing apparatus, whereby the first surface 2 is formed to be a mirror surface.

The wafer 20 illustrated in FIG. 3 is produced by cutting a part of the SiC ingot 1 and subjecting a surface 21 cut from the SiC ingot 1 to grinding, polishing and the like. Devices are formed on a front surface of the wafer 20 after the wafer 20 is cut from the SiC ingot 1. In the first embodiment, the device is a metal-oxide semiconductor field-effect transistor (MOSFET), micro electro mechanical systems (MEMS), or a Schottky barrier diode (SBD), but, in the present invention, the device is not limited to the MOSFET, MEMS, and SBD. Note that the same parts of the wafer 20 as those of the SiC ingot 1 are denoted by the same reference symbols and descriptions of them are omitted. As depicted in FIG. 4, the wafer forming method according to the first embodiment includes a peeling layer forming step 1001 and a wafer forming step 1002.
(Peeling Layer Forming Step)

Figure 5:
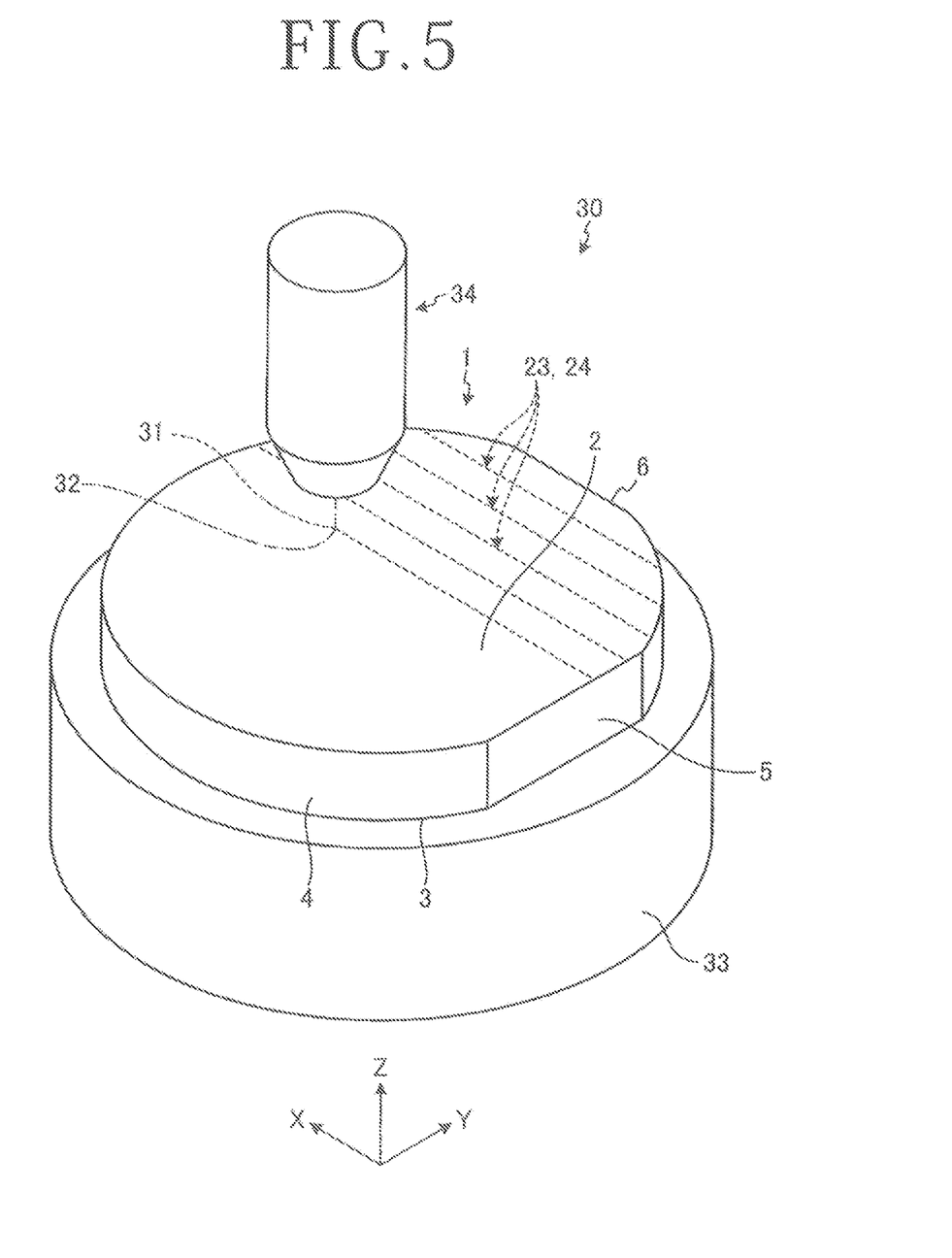
FIG. 5 is a perspective view depicting a peeling layer forming step of the wafer forming method depicted in FIG. 4.
Figure 6:
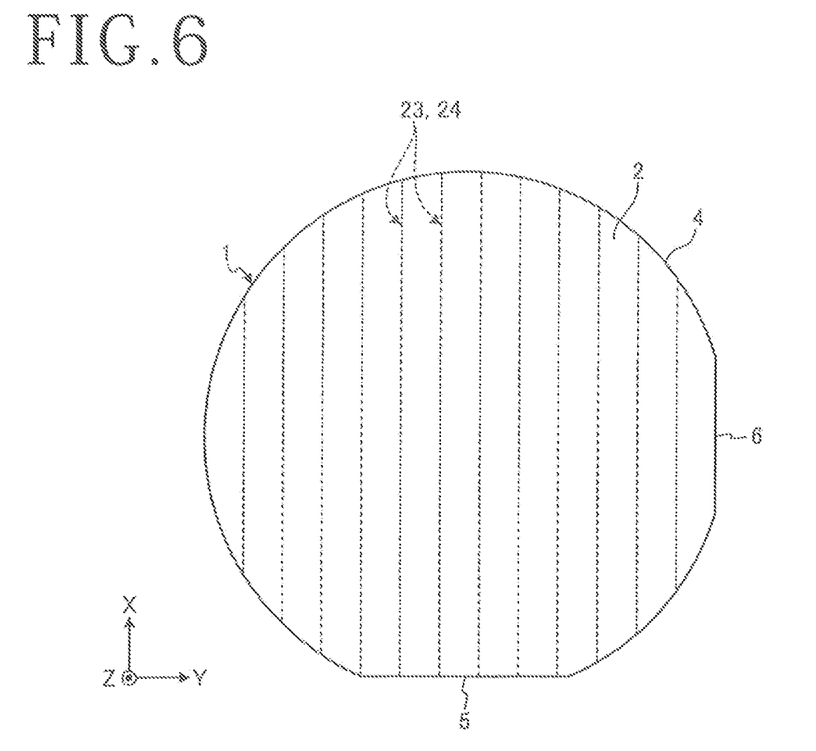
FIG. 6 is a plan view of a SiC ingot after the peeling layer forming step of the wafer forming method depicted in FIG. 4.
Figure 7:
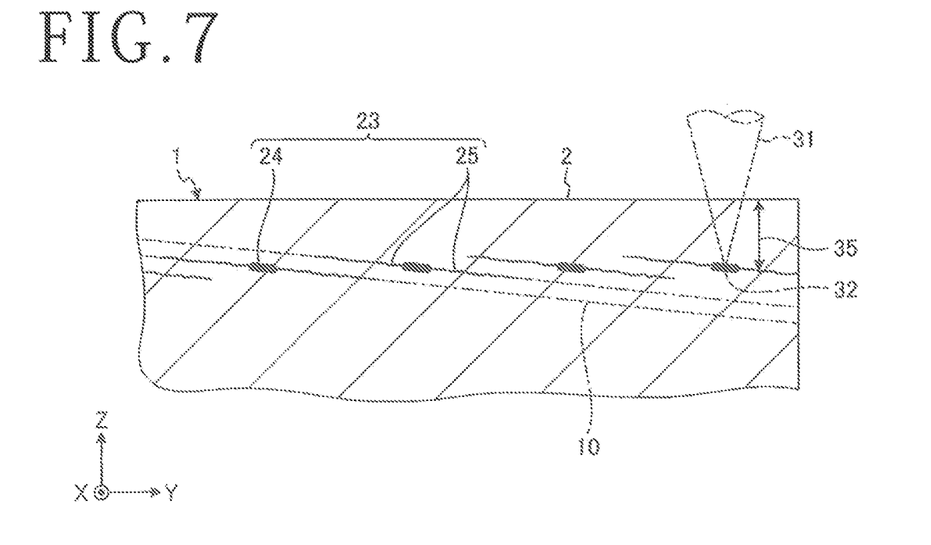
FIG. 7 is a sectional view of a major part of the SiC ingot after the peeling layer forming step of the wafer forming method depicted in FIG. 4.

FIG. 5 is a perspective view depicting the peeling layer forming step of the wafer forming method depicted in FIG. 4. FIG. 6 is a plan view of the SiC ingot after the peeling layer forming step of the wafer forming method depicted in FIG. 4. FIG. 7 is a sectional view of a major part of the SiC ingot after the peeling layer forming step of the wafer forming method depicted in FIG. 4.

The peeling layer forming step 1001 is a step of applying, to the SiC ingot 1, a laser beam 31 (depicted in FIG. 5) of such a wavelength as to be transmitted through the SiC ingot 1, with a focal point 32 (depicted in FIG. 5) positioned at a depth corresponding to a thickness 22 (depicted in FIG. 3) of the wafer 20 to be formed from the first surface 2 of the SiC ingot 1. In addition, the peeling layer forming step 1001 is also a step of applying the laser beam 31 to the SiC ingot 1 to form a peeling layer 23, depicted in FIGS. 6 and 7, in the inside of the SiC ingot 1.

As illustrated in FIG. 5, in the peeling layer forming step 1001, a laser processing apparatus 30 holds the second surface 3 side of the SiC ingot 1 on a chuck table 33, images the SiC ingot 1 by unillustrated imaging means, adjusts the orientation of the SiC ingot 1 to a predetermined orientation, and adjusts the relative positions of a laser beam applying unit 34 and the SiC ingot 1 in horizontal directions. In the peeling layer forming step 1001 of the first embodiment, the laser processing apparatus 30 sets the second orientation flat 6 parallel to an X-axis direction parallel to a horizontal direction and sets the inclination direction 8 and the first orientation flat 5 parallel to a Y-axis direction parallel to a horizontal direction and orthogonal to the X-axis direction.

In the peeling layer forming step 1001, the laser processing apparatus 30 sets a focal point 32 of the laser beam 31 applied from the laser beam applying unit 34, to a position of a desired depth 35 (depicted in FIG. 7) from the first surface 2 of the SiC ingot 1. Note that the desired depth 35 is a depth corresponding to the thickness 22 of the wafer 20.

In the peeling layer forming step 1001, the laser processing apparatus 30 applies a pulsed laser beam 31 of such a wavelength as to be transmitted through the SiC ingot 1 from the laser beam applying unit 34 to the SiC ingot 1, while relatively moving the chuck table 33 and the laser beam applying unit 34 in the X-axis direction at a predetermined feeding speed. As a result, as depicted in FIG. 6, by the application of the pulsed laser beam 31, a modified section 24 in which SiC is separated into Si (silicon) and C (carbon), the pulsed laser beam 31 applied next is absorbed in previously formed C, and SiC is separated into Si and C in a chain reaction manner is formed in the SiC ingot 1 along the X-axis direction, and cracks 25 extending from the modified section 24 along the c-plane 10 are formed. In this way, in the peeling layer forming step 1001, the peeling layer 23 including the modified section 24 and the cracks 25 formed along the c-plane 10 from the modified section 24 is formed.

In the peeling layer forming step 1001, when the laser processing apparatus 30 has applied the laser beam 31 over the whole length of the SiC ingot 1 in the X-axis direction, the chuck table 33 and the laser beam applying unit 34 are put into relative indexing feeding in the Y-axis direction. In the peeling layer forming step 1001, the laser processing apparatus 30 repeats an operation of relatively moving the chuck table 33 and the laser beam applying unit 34 in the X-axis direction while applying the laser beam 31 and an operation of putting the chuck table 33 and the laser beam applying unit 34 into relative indexing feeding in the Y-axis direction.

As a result, the peeling layers 23 which include the modified section 24 where SiC has been separated into Si and C and cracks 25 and which are lowered in strength than the other parts can be formed at the desired depth 35 corresponding to the thickness 22 of the wafer 20 from the first surface 2 of the SiC ingot 1, on the basis of the moving distance in the indexing feeding in the Y-axis direction. When the peeling layers 23 have been formed at the desired depth 35 of the SiC ingot 1 over the whole length in the Y-axis direction on the basis of the moving distance in the indexing feeding, the control proceeds to the wafer forming step 1002.

(Wafer Forming Step)

Figure 8:
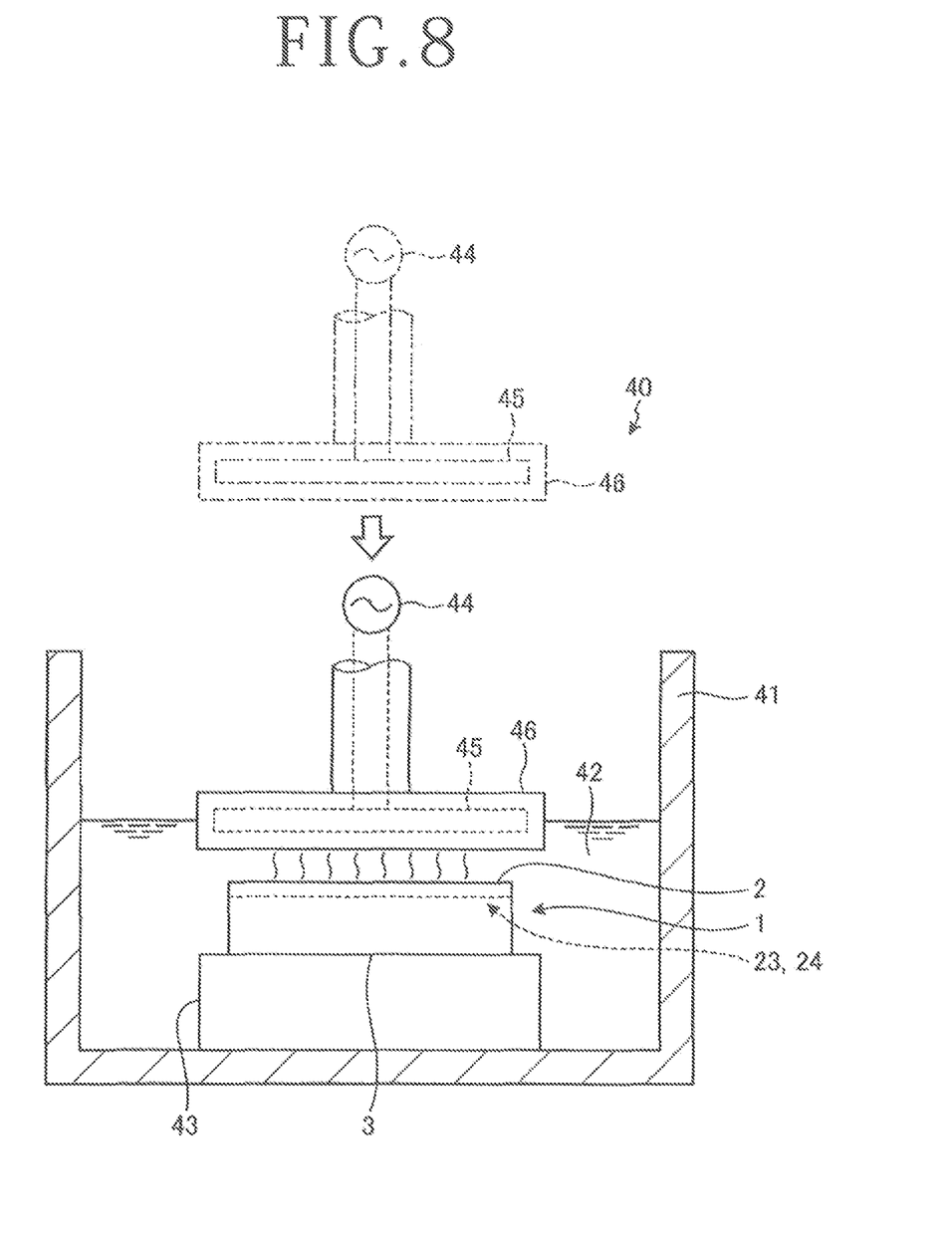
FIG. 8 is a sectional view schematically illustrating a wafer forming step of the wafer forming method depicted in FIG. 4.
Figure 9:
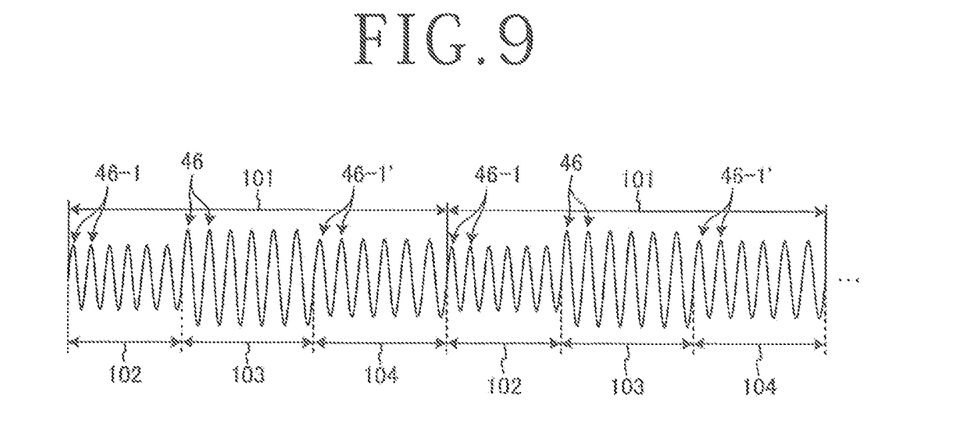
FIG. 9 is a diagram depicting an example of a voltage which an ultrasonic power source applies to an ultrasonic vibrator, in the wafer forming step of the wafer forming method depicted in FIG. 4.
Figure 10:
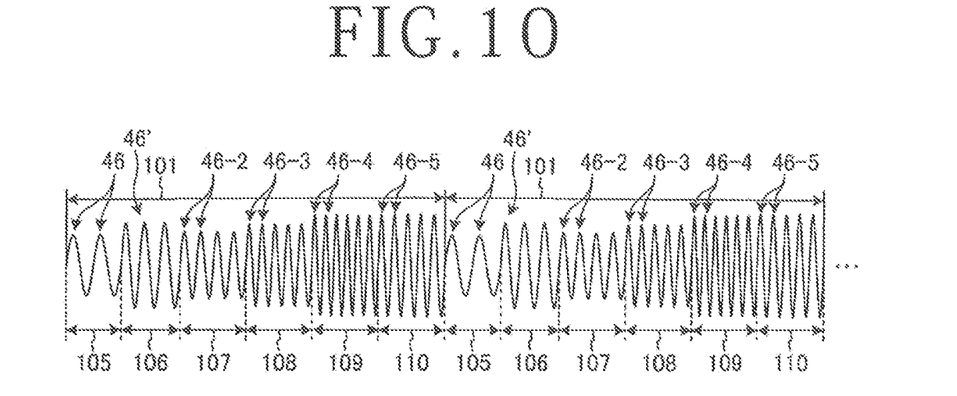
FIG. 10 is a diagram depicting another example of the voltage which the ultrasonic power source applies to the ultrasonic vibrator, in the wafer forming step of the wafer forming method depicted in FIG. 4.
Figure 11:
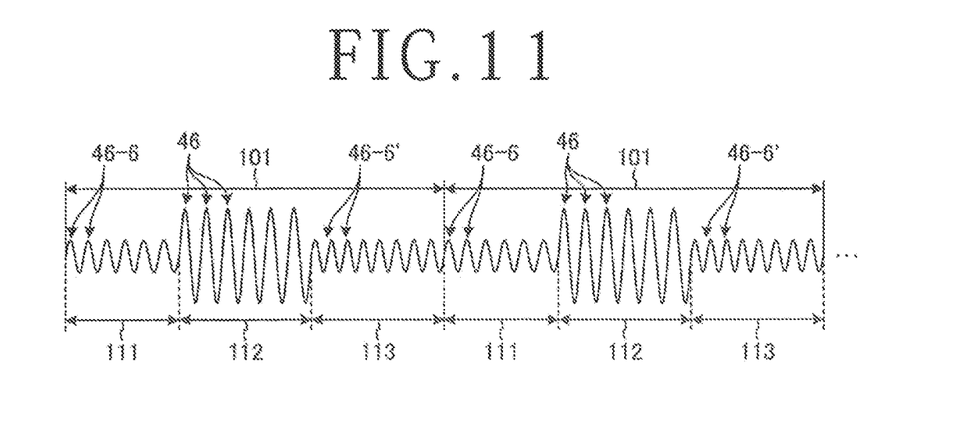
FIG. 11 is a diagram depicting a further example of the voltage which the ultrasonic power source applies to the ultrasonic vibrator, in the wafer forming step of the wafer forming method depicted in FIG. 4.

FIG. 8 is a sectional view schematically illustrating the wafer forming step of the wafer forming method depicted in FIG. 4. FIG. 9 is a diagram depicting an example of a voltage which an ultrasonic power source applies to an ultrasonic vibrator in the wafer forming step of the wafer forming method depicted in FIG. 4. FIG. 10 is a diagram depicting another example of the voltage which the ultrasonic power source applies to the ultrasonic vibrator in the wafer forming step of the wafer forming method depicted in FIG. 4. FIG. 11 is a diagram depicting a further example of the voltage which the ultrasonic power source applies to the ultrasonic vibrator in the wafer forming step of the wafer forming method depicted in FIG. 4.

The wafer forming step 1002 is a step of immersing the SiC ingot 1 in a liquid 42 in a liquid tank 41 of a peeling apparatus 40 depicted in FIG. 8, and an ultrasonic wave is applied to the SiC ingot 1 through the liquid 42, to peel off a part on the first surface 2 side of the SiC ingot 1 with the peeling layers 23 as an interface and form the peeled-off part as a wafer 20.

In the wafer forming step 1002 of the first embodiment, the second surface 3 side of the SiC ingot 1 is mounted on a mount table 43 in the liquid tank 41 accommodating the liquid 42 of the peeling apparatus 40 depicted in FIG. 8, and an ultrasonic wave applying unit 46 including an ultrasonic vibrator 45 including a piezoelectric ceramic to which a voltage is applied by the ultrasonic power source 44 is inserted into the liquid tank 41 from the position indicated by a broken line in FIG. 8 toward the position indicated by a solid line. In the wafer forming step 1002 of the first embodiment, the ultrasonic wave applying unit 46 is immersed in the liquid 42 in the liquid tank 41 and is made to face the first surface 2 of the SiC ingot 1 on the mount table 43 through the liquid 42.

In the wafer forming step 1002 of the first embodiment, a voltage is applied from the ultrasonic power source 44 to the ultrasonic vibrator 45, to put the ultrasonic vibrator 45 into ultrasonic vibration. As a result, the ultrasonic vibration at a frequency according to the vibration of the ultrasonic vibrator 45 is propagated in the liquid 42. In the wafer forming step 1002 of the first embodiment, the ultrasonic vibration generated in the liquid 42 is applied to the SiC ingot 1.

In the wafer forming step 1002, the ultrasonic vibration is applied to the SiC ingot 1 through the liquid 42 in the liquid tank 41, whereby a part on the first surface 2 side as compared to the peeling layers 23 of the SiC ingot 1 is peeled off as the wafer 20.

In the wafer forming step 1002 of the first embodiment, the ultrasonic vibration is applied to the SiC ingot 1 while a sweep treatment of regularly varying the frequency of the voltage applied to the ultrasonic vibrator that is the oscillation frequency of the ultrasonic vibrator 45 is performed, as depicted in FIGS. 9, 10, and 11. Note that the axis of abscissas in FIGS. 9, 10, and 11 represents the time elapsed from the start of application of the voltage and the axis of ordinates represents the voltage applied to the ultrasonic vibrator 45.

As depicted in FIGS. 9, 10, and 11, in the wafer forming step 1002 of the first embodiment, repeating one cycle 101 of applying voltages of a plurality of different frequencies to the ultrasonic vibrator 45 is referred to as performing a sweep treatment of regularly varying the oscillation frequency of the ultrasonic vibrator. In the sweep treatment, the predetermined frequency at which the one cycle 101 is repeated is referred to as the frequency of the sweep treatment.

In the wafer forming step 1002 of the first embodiment, the frequency varied by the sweep treatment in the one cycle 101 of applying a plurality of different voltages to the ultrasonic vibrator 45 includes the resonance frequency 46 of the ultrasonic vibrator 45, but, in the present invention, the resonance frequency 46 may not necessarily be included. In addition, in the wafer forming step 1002, for example, in the case where the resonance frequency 46 of the ultrasonic vibrator 45 is 35 kHz, the frequency varied by the sweep treatment in the one cycle 101 of applying a plurality of different voltages to the ultrasonic vibrator 45 includes the resonance frequency 46 and different frequencies 46', 46-1, 46-1', 46-2, 46-3, 46-4, 46-5, 46-6 and 46-6' such as ±1 kHz, ±5 kHz, ±10 kHz, and ±15 kHz.

Note that FIG. 9 illustrates an example in which the frequency varied by the sweep treatment in the one cycle 101, for example, in the case where the resonance frequency 46 of the ultrasonic vibrator 45 is 35 kHz, includes a frequency 46-1 of 34 kHz which is −1 kHz relative to the resonance frequency 46, the resonance frequency 46, and a frequency 46-1' of 36 kHz which is +1 kHz relative to the resonance frequency 46. In the example depicted in FIG. 9, the frequency in the one cycle 101 is set to the frequency 46-1 for a predetermined time period 102, thereafter the frequency is set to the resonance frequency 46 for a predetermined time period 103, and thereafter the frequency is set to a frequency 46-1' for a predetermined time period 104.

FIG. 10 depicts an example in which the frequency varied by the sweep treatment in the one cycle 101, for example, in the case where the resonance frequency 46 of the ultrasonic vibrator 45 is 35 kHz, includes the resonance frequency 46 and five frequencies 46', 46-2, 46-3, 46-4, and 46-5 different from the resonance frequency 46. In the example depicted in FIG. 10, the frequency in the one cycle 101 is set to the resonance frequency 46 for a predetermined time period 105, thereafter the frequency is set to a frequency 46' for a predetermined time period 106, thereafter the frequency is set to a frequency 46-2 for a predetermined time period 107, thereafter the frequency is set to a frequency 46-3 for a predetermined time period 108, thereafter the frequency is set to a frequency 46-4 for a predetermined time period 109, and thereafter the frequency is set to a frequency 46-5 for a predetermined time period 110.

FIG. 11 illustrates an example in which the frequency varied by the sweep treatment in the one cycle 101, for example, in the case where the resonance frequency 46 of the ultrasonic vibrator 45 is 35 kHz, includes a frequency 46-6 of 20 kHz which is −15 kHz relative to the resonance frequency 46, the resonance frequency 46, and a frequency 46-6' of 50 kHz which is +15 kHz relative to the resonance frequency 46. In the example depicted in FIG. 11, the frequency in the one cycle 101 is set to the frequency 46-6 for a predetermined time period 111, thereafter the frequency is set to the resonance frequency 46 for a predetermined time period 112, and thereafter the frequency is set to the frequency 46-6' for a predetermined time period 113.

In addition, in the first embodiment, the frequency of the sweep treatment, or the frequency of repeating the one cycle 101 depicted in FIGS. 9, 10, and 11, is a frequency equal to or more than a frequency approximate to the specific frequency of the wafer 20 to be formed from the SiC ingot 1 but equal to or less than the resonance frequency of the ultrasonic vibrator 45; in the present invention, however, the frequency of the sweep treatment, or the frequency of repeating the one cycle 101, is not limited to a frequency equal to or more than a frequency approximate to the specific frequency of the wafer 20 but equal to or less than the resonance frequency of the ultrasonic vibrator 45. Note that, in the present invention, the frequency approximate to the specific frequency of the wafer 20 is a frequency of 0.8 to 1.2 times the specific frequency of the wafer 20.

For example, in the case where the thickness 22 of the wafer 20 is 370 μm, the specific frequency of the wafer 20 is 707 Hz. The frequency of the sweep treatment is, for example, 500 Hz, 625 Hz, 714 Hz, 833 Hz, 1.1 kHz, 1.7 kHz, or 3.3 kHz. Note that, in the present invention, when the frequency of the sweep treatment, or the frequency of repeating the one cycle 101, is equal to or more than a frequency approximate to the specific frequency of the wafer 20, the wafer 20 can be efficiently vibrated in the liquid 42, and the required time until the wafer 20 is peeled off from the SiC ingot 1 can be reduced. In addition, when the frequency of the sweep treatment, or the frequency of repeating the one cycle 101, is less than a frequency approximate to the specific frequency of the wafer 20, the required time until the peeling-off cannot be reduced. Besides, when the frequency of the sweep treatment, or the frequency of repeating the one cycle 101, is a frequency equal to or less than the resonance frequency of the ultrasonic vibrator 45, the wafer 20 can be efficiently vibrated in the liquid 42, and the required time until the wafer 20 is peeled off from the SiC ingot 1 can be reduced. In addition, in the present invention, when the frequency of the sweep treatment, or the frequency of repeating the one cycle 101, is a frequency in excess of the resonance frequency of the ultrasonic vibrator 45, the sweep treatment is physically impossible, and, therefore, the frequency of the sweep treatment is a frequency equal to or less than the resonance frequency of the ultrasonic vibrator 45.

In the wafer forming step 1002 of the first embodiment, the ultrasonic vibration is applied to the SiC ingot 1 through the liquid 42 for a predetermined period of time to peel off a part of the SiC ingot 1 and form the wafer 20, upon which the wafer forming step 1002 is completed.

As has been described above, in the wafer forming step 1002 of the wafer forming method according to the first embodiment, the ultrasonic vibration is applied to the SiC ingot 1 while the sweep treatment of regularly varying the frequency of the voltage applied to the ultrasonic vibrator 45 is performed, and thus, an effect that the wafer 20 can be stably and efficiently peeled off from the SiC ingot 1 formed with the peeling layers 23, by, for example, movement of positions of a compressional wave, even if the resonance frequency of the ultrasonic vibrator 45 is varied due to load variation, is exhibited.

In addition, in the wafer forming method according to the first embodiment, by setting the frequency of the sweep treatment to a frequency equal to or more than a frequency approximate to the specific frequency of the wafer 20, the wafer 20 can be efficiently vibrated, and thus, an effect that the required time until the wafer 20 is peeled off from the SiC ingot 1 can be reduced and the wafer 20 can be stably and efficiently peeled off from the SiC ingot 1 is exhibited.

Besides, in the wafer forming method according to the first embodiment, the frequency in the one cycle 101 varied by the sweep treatment includes the resonance frequency of the ultrasonic vibrator 45, and thus, the amplitude of the ultrasonic vibrator 45 can be enlarged. Accordingly, the ultrasonic vibration can be stably and efficiently applied to the whole of the SiC ingot 1 formed with the peeling layers 23, or the whole of the SiC ingot 1 inclusive of the wafer 20 yet to be peeled off.

Second Embodiment

Figure 12:
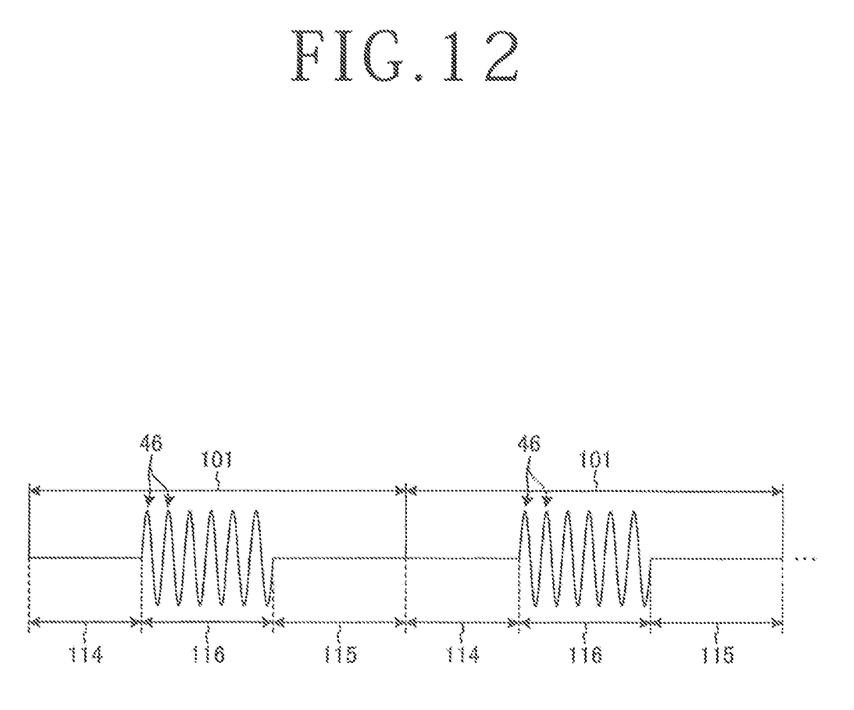
FIG. 12 is a diagram depicting an example of a voltage which an ultrasonic power source applies to an ultrasonic vibrator, in a wafer forming step of a wafer forming method according to a second embodiment.

A wafer forming method according to a second embodiment of the present invention will be described based on the drawings. FIG. 12 is a diagram depicting an example of a voltage which an ultrasonic power source applies to an ultrasonic vibrator in a wafer forming step of the wafer forming method according to the second embodiment.

The wafer forming method according to the second embodiment is the same as that in the first embodiment, except that, in the wafer forming step 1002, the ultrasonic vibration is applied to the SiC ingot 1 while the ultrasonic vibration from an ultrasonic vibrator 45 is intermittently oscillated by intermittent application of a voltage to the ultrasonic vibrator 45, as depicted in FIG. 12. Note that the axis of abscissas in FIG. 12 represents the time elapsed from the start of application of the voltage and the axis of ordinates represents the voltage applied to the ultrasonic vibrator 45.

As illustrated in FIG. 12, in the wafer forming step 1002 of the second embodiment, combining predetermined time periods 114 and 115 of not applying a voltage to the ultrasonic vibrator 45 and not oscillating an ultrasonic wave from the ultrasonic vibrator 45 with a predetermined time period 116 of oscillating an ultrasonic wave from the ultrasonic vibrator 45 by applying a voltage to the ultrasonic vibrator 45 to thereby configure one cycle 101 and repeat this one cycle 101 at a predetermined frequency is referred to as applying the ultrasonic vibration to the SiC ingot 1 while intermittently oscillating the ultrasonic wave.

In the wafer forming step 1002 of the second embodiment, the frequency in the one cycle 101 of applying the voltage to the ultrasonic vibrator 45 includes the resonance frequency 46 of the ultrasonic vibrator 45, but, in the present invention, the frequency may not necessarily include the resonance frequency.

Note that the example depicted in FIG. 12 is an example in which, in one cycle 101, a voltage is not applied to the ultrasonic vibrator 45 for a predetermined time period 114, thereafter the frequency of the voltage applied to the ultrasonic vibrator 45 is the resonance frequency 46 for a predetermined time period 116, and thereafter a voltage is not applied to the ultrasonic vibrator 45 for a predetermined time period 115.

In addition, in the second embodiment, the frequency of a process ranging from oscillation of the ultrasonic wave of the ultrasonic vibrator 45 through the rest of the oscillation to the re-oscillation, or the frequency of repeating the one cycle 101 depicted in FIG. 12, is a frequency equal to or more than a frequency approximate to the specific frequency of the wafer 20 to be formed from the SiC ingot 1 but equal to or less than the resonance frequency of the ultrasonic vibrator 45. In the present invention, however, the frequency of a process ranging from oscillation of the ultrasonic wave of the ultrasonic vibrator 45 through the rest of the oscillation to the re-oscillation, or the frequency of repeating the one cycle 101, is not limited to the frequency equal to or more than the frequency approximate to the specific frequency of the wafer 20 but equal to or less than the resonance frequency of the ultrasonic vibrator 45.

Note that, in the present invention, when the frequency of a process ranging from oscillation of the ultrasonic wave of the ultrasonic vibrator 45 through the rest of the oscillation to the re-oscillation, or the frequency of repeating the one cycle 101, is equal to or more than a frequency approximate to the specific frequency of the wafer 20, the wafer 20 can be efficiently vibrated in the liquid 42, and the required time until the wafer 20 is peeled off from the SiC ingot 1 can be reduced. In addition, when the frequency of a process ranging from oscillation of the ultrasonic wave of the ultrasonic vibrator 45 through the rest of the oscillation to the re-oscillation is less than the frequency approximate to the specific frequency of the wafer 20, the required time until the peeling-off cannot be reduced. Besides, when the frequency of a process ranging from oscillation of the ultrasonic wave of the ultrasonic vibrator 45 through the rest of the oscillation to the re-oscillation, or the frequency of repeating the one cycle 101, is equal to or less than the resonance frequency of the ultrasonic vibrator 45, the wafer 20 can be efficiently vibrated in the liquid 42, and the required time until the wafer 20 is peeled off from the SiC ingot 1 can be reduced. In addition, in the present invention, the frequency of a process ranging from oscillation of the ultrasonic wave of the ultrasonic vibrator 45 through the rest of the oscillation to the re-oscillation, or the frequency of repeating the one cycle 101, is a frequency equal to or less than the resonance frequency of the ultrasonic vibrator 45, since it is physically impossible to intermittently oscillate the ultrasonic wave at a frequency in excess of the resonance frequency of the ultrasonic vibrator 45.

As has been described above, in the wafer forming step 1002 of the wafer forming method according to the second embodiment, the ultrasonic vibration is applied to the SiC ingot 1 while the ultrasonic wave from the ultrasonic vibrator 45 is intermittently oscillated by intermittent application of a voltage to the ultrasonic vibrator 45. Therefore, the ultrasonic vibration can be efficiently applied to the SiC ingot 1 by, for example, movement of the positions of a compressional wave, even if the resonance frequency of the ultrasonic vibrator 45 is varied due to load variation. As a result, the wafer forming method according to the second embodiment exhibits an effect that the wafer 20 can be stably and efficiently peeled off from the SiC ingot 1 formed with the peeling layers 23.

In addition, in the wafer forming method according to the second embodiment, the frequency of a process ranging from oscillation of the ultrasonic vibration of the ultrasonic vibrator 45 through the rest of the oscillation to the re-oscillation is set to a frequency equal to or more than a frequency approximate to the specific frequency of the wafer 20, whereby the wafer 20 can be vibrated efficiently. Therefore, the required time until the wafer 20 is peeled off from the SiC ingot 1 can be reduced, and an effect that the wafer 20 can be stably and efficiently peeled off from the SiC ingot 1 formed with the peeling layers 23 is exhibited.

Besides, in the wafer forming method according to the second embodiment, the frequency in the one cycle 101 includes the resonance frequency of the ultrasonic vibrator 45, and, therefore, the amplitude of the ultrasonic vibrator 45 can be enlarged, so that the ultrasonic vibration can be stably and efficiently applied to the whole of the SiC ingot 1 formed with the peeling layers 23.

Next, the inventors of the present invention checked the effects of the wafer forming methods according to the first embodiment and the second embodiment. The results are set forth in Table 1 below.

TABLE 1

| | Peeling-off property | Required time until peeling-off |
|---|---|---|
| Comparative Example | Fair | Long |
| Invention Product 1 | Good | Fairly short |
| Invention Product 2 | Good | Short |
| Invention Product 3 | Good | Short |
| Invention Product 4 | Good | Short |
| Invention Product 5 | Good | Short |
| Invention Product 6 | Good | Short |
| Invention Product 7 | Good | Short |
| Invention Product 8 | Good | Fairly short |
| Invention Product 9 | Good | Short |
| Invention Product 10 | Good | Short |

In Table 1, after the peeling layer forming step 1001 was carried out, ultrasonic vibration was applied to the SiC ingot 1 by use of a peeling apparatus 40 including an ultrasonic vibrator 45 having a resonance frequency of 35 kHz depicted in FIG. 8. In addition, in Table 1, the thickness 22 of the wafer 20 was set to 370 μm, the specific frequency of the wafer 20 was set to 707 Hz, an acoustic emission (AE) sensor was attached to the first surface 2 of the SiC ingot 1 from which the wafer 20 is to be peeled off, the amplitude of vibration of the first surface 2 (in practice, the voltage value which increases as the amplitude as an output value of the AE sensor increases) was measured, and the required time until the wafer 20 is peeled off from the SiC ingot 1 was measured.

In the Comparative Example, a voltage of the resonance frequency was applied to the ultrasonic vibrator continuously for a predetermined period of time. In Invention Product 1, the wafer forming step 1002 of the first embodiment was carried out for a predetermined period of time, with the frequency of the sweep treatment in the wafer forming step 1002 of the first embodiment set to 500 Hz. In Invention Product 2, the wafer forming step 1002 of the first embodiment was conducted for a predetermined period of time, with the frequency of the sweep treatment in the wafer forming step 1002 of the first embodiment set to 625 Hz. In Invention Product 3, the wafer forming step 1002 of the first embodiment was carried out for a predetermined period of time, with the frequency of the sweep treatment in the wafer forming step 1002 of the first embodiment set to 714 Hz. In Invention Product 4, the wafer forming step 1002 of the first embodiment was performed for a predetermined period of time, with the frequency of the sweep treatment in the wafer forming step 1002 of the first embodiment set to 833 Hz.

In Invention Product 5, the wafer forming step 1002 of the first embodiment was carried out for a predetermined period of time, with the frequency of the sweep treatment in the wafer forming step 1002 of the first embodiment set to 1.1 kHz. In Invention Product 6, the wafer forming step 1002 of the first embodiment was conducted for a predetermined period of time, with the frequency of the sweep treatment in the wafer forming step 1002 of the first embodiment set to 1.7 kHz. In Invention Product 7, the wafer forming step 1002 of the first embodiment was carried out for a predetermined period of time, with the frequency of the sweep treatment in the wafer forming step 1002 of the first embodiment set to 3.3 kHz.

In Invention Product 8, the wafer forming step 1002 of the second embodiment was carried out for a predetermined period of time, with the frequency of a process ranging from oscillation of the ultrasonic wave through the rest of the oscillation to the re-oscillation in the wafer forming step 1002 of the second embodiment set to 500 Hz. In Invention Product 9, the wafer forming step 1002 of the second embodiment was conducted for a predetermined period of time, with the frequency of a process ranging from oscillation of the ultrasonic wave through the rest of the oscillation to the re-oscillation in the wafer forming step 1002 of the second embodiment set to 625 Hz. In Invention Product 10, the wafer forming step 1002 of the second embodiment was carried out for a predetermined period of time, with the frequency of a process ranging from oscillation of the ultrasonic wave through the rest of the oscillation to the re-oscillation in the wafer forming step 1002 of the second embodiment set to 3.3 kHz.

In the Comparative Example, the required time until the wafer 20 is peeled off from the SiC ingot 1 within a predetermined period of time was very long, but, in Invention Product 1 to Invention Product 10, the wafer 20 can be peeled off from the SiC ingot 1 within a predetermined period of time. Therefore, according to Table 1, it has been made clear that, by applying an ultrasonic vibration to the SiC ingot 1, while performing the sweep treatment of regularly varying the frequency of the voltage applied to the ultrasonic vibrator 45, or while intermittently oscillating the ultrasonic wave from the ultrasonic vibrator 45, in the wafer forming step 1002, an effect that the wafer 20 can be stably and efficiently peeled off from the SiC ingot 1 formed with the peeling layers 23 can be exhibited.

In addition, while the output value of the AE sensor in Invention Product 1 was 2.5 mV, the output value of the AE sensor in Invention Product 2 was 22 mV, and the output value of the AE sensor in Invention Product 3 was 16 mV, and the required time until the wafer 20 is peeled off from the SiC ingot 1 in Invention Product 2 to Invention Product 7, Invention Product 9, and Invention Product 10 was by far shorter than that in Invention Product 1 and Invention Product 8. Therefore, according to Table 1, it has been made clear that, by setting the frequency of the sweep treatment, or the frequency of a process ranging from oscillation of the ultrasonic wave of the ultrasonic vibrator 45 through the rest of the oscillation to the re-oscillation, to be a frequency equal to or more than a frequency approximate to the specific frequency of the wafer 20, in the wafer forming step 1002, a part of the SiC ingot 1 can be efficiently vibrated, and an effect that the wafer 20 can be stably and efficiently peeled off from the SiC ingot 1 formed with the peeling layers 23 is exhibited.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A wafer forming method for forming a wafer from a silicon carbide (SiC) ingot having a c-axis and a c-plane orthogonal to the c-axis, the wafer forming method comprising:
   a peeling layer forming step of applying, to the SiC ingot, a laser beam of such a wavelength as to be transmitted through the SiC ingot, with a focal point of the laser beam positioned at a depth corresponding to a thickness of the wafer to be formed from an end surface of the SiC ingot, to form a peeling layer including a modified section and cracks extending along the c-plane from the modified section; and
   a wafer forming step of immersing the SiC ingot in a liquid and applying an ultrasonic vibration to the SiC ingot through the liquid, to thereby peel a part of the SiC ingot with the peeling layer as an interface and form the wafer,
   wherein, in the wafer forming step, the ultrasonic vibration is applied to the SiC ingot by varying a voltage applied to an ultrasonic vibrator between at least two different peak-to-peak amplitudes and two different non-zero oscillation frequencies within each of a plurality of cycles.

2. The wafer forming method according to claim 1, wherein, in the wafer forming step, one of the oscillation frequencies is set to be equal to or more than a frequency approximate to a specific frequency of the wafer to be formed from the SiC ingot.

3. The wafer forming method according to claim 1, wherein one of the oscillation frequencies includes a resonance frequency of the ultrasonic vibrator.

4. The wafer forming method according to claim 1, wherein the voltage applied to the ultrasonic vibrator varies between at least three different peak-to-peak amplitudes and three different non-zero oscillation frequencies within each cycle.

5. A wafer forming method for forming a wafer from a silicon carbide (SiC) ingot having a c-axis and a c-plane orthogonal to the c-axis, the wafer forming method comprising:
   a peeling layer forming step of applying, to the SiC ingot, a laser beam of such a wavelength as to be transmitted through the SiC ingot, with a focal point of the laser beam positioned at a depth corresponding to a thickness of the wafer to be formed from an end surface of the SiC ingot, to form a peeling layer including a modified section and cracks extending along the c-plane from the modified section; and
   a wafer forming step of immersing the SiC ingot in a liquid, and applying an ultrasonic vibration to the SiC ingot through the liquid, to thereby peel a part of the SiC ingot with the peeling layer as an interface and form the wafer,
   wherein, in the wafer forming step, each repeating cycle includes a first period of zero voltage, a second period of sinusoidal voltage and a third period of zero voltage being applied to the ultrasonic vibrator for generating the ultrasonic vibration of an oscillation frequency, and a frequency at which the cycle is repeated is set to be equal to or more than a frequency approximate to a natural frequency of the wafer to be formed from the SiC ingot and having a thickness smaller than the ingot.

6. The wafer forming method according to claim 5, wherein the oscillation frequency of the ultrasonic vibrator applied to the SiC ingot includes a resonance frequency of the ultrasonic vibrator.

7. The wafer forming method according to claim 5, wherein the frequency at which the cycle is repeated is set to be equal to or less than a resonance frequency of the ultrasonic vibrator for applying the ultrasonic vibration to the SiC ingot.

\* \* \* \* \*